(12) United States Patent
Bienn et al.

(10) Patent No.: US 8,199,727 B1
(45) Date of Patent: Jun. 12, 2012

(54) CALL DELIVERY IN A CDMA LEGACY MS DOMAIN FOR SIP CALL ORIGINATION

(75) Inventors: Marvin Bienn, Dallas, TX (US); Gary Stephens, Richardson, TX (US); Todd Spraggins, Dallas, TX (US)

(73) Assignee: Ericsson AB, Stockholm (SE)

( * ) Notice: Subject to any disclaimer, the term of this patent is extended or adjusted under 35 U.S.C. 154(b) by 1277 days.

(21) Appl. No.: 10/990,735

(22) Filed: Nov. 17, 2004

Related U.S. Application Data

(60) Provisional application No. 60/520,720, filed on Nov. 17, 2003.

(51) Int. Cl.
   *H04B 7/216* (2006.01)
(52) U.S. Cl. ........ 370/335; 370/352; 370/329; 370/401; 370/231; 370/310; 370/469; 370/322; 370/319; 379/115.01; 379/125.2; 709/204; 455/416; 455/426; 455/445; 455/414.1
(58) Field of Classification Search .................. 370/352, 370/329, 401, 231, 310, 469, 322, 319, 359, 370/260, 261, 265, 390, 420, 421; 455/416, 455/426.2, 445, 414.1; 379/115.01, 125, 379/2, 16; 709/204
See application file for complete search history.

(56) References Cited

U.S. PATENT DOCUMENTS

| | | | |
|---|---|---|---|
| 6,256,612 B1 | 7/2001 | Vo et al. | |
| 7,031,703 B1 | 4/2006 | Graf et al. | |
| 7,142,881 B2 | 11/2006 | Sekino et al. | |
| 7,394,807 B2 | 7/2008 | Hamiti et al. | |
| 7,444,139 B1 * | 10/2008 | Welch et al. | 455/416 |
| 2002/0034166 A1 * | 3/2002 | Barany et al. | 370/329 |
| 2003/0147427 A1 | 8/2003 | Sekino et al. | |
| 2003/0169768 A1 * | 9/2003 | Bienn et al. | 370/469 |
| 2004/0047437 A1 | 3/2004 | Hamiti et al. | |
| 2004/0174847 A1 | 9/2004 | Menon et al. | |
| 2004/0196867 A1 * | 10/2004 | Ejzak et al. | 370/468 |
| 2004/0247107 A1 * | 12/2004 | Chen et al. | 379/219 |

OTHER PUBLICATIONS

Network Working Group (Session Initialization Protocol), Jun. 2002 , J Rosemberg et al.*
Network Working Group (Session Initialization Protocol), Jun. 2002, J Rosemberg et al.*
3rd Generation Partnership Project 2 Version 1.0.0, Nov. 2002.*
3GPP TSG_CN (Jun. 2000) 3GPP Workshop #1 on TrFO-TFO Harmonization.*

* cited by examiner

*Primary Examiner* — Rafael Pérez-Gutiérrez
*Assistant Examiner* — Joseph Arévalo
(74) *Attorney, Agent, or Firm* — Christopher & Weisberg, P.A.

(57) ABSTRACT

A system and a method in a wireless network utilizing session initiation protocol (SIP) for call control. The SIP payload (SDP) contains a list of available transcoders (codecs) to coordinate transcoder selection to allow for the minimization of transcoders. An additional aspect of the embodiment of the present invention includes a serving MSCe that is operable to determine whether to initiate ringback to the calling party. If ring back is to be initiated, ringback can be initiated from the serving MSCe or from a network element supporting the calling party. The call negotiation process according to the described embodiment of the invention eliminates the requirement for any transcoding in specific situations to result in the number of transcoders used in the voice bearer path to be reduced to 0 (TrFO, Transcoder Free Operation) or to 1 (RTO, remote transmitter operation).

20 Claims, 4 Drawing Sheets

CALL DELIVERY IN A CDMA LEGACY MS DOMAIN FOR SIP CALL ORIGINATION

CROSS REFERENCE TO RELATED APPLICATIONS

This application claims priority under 35 U.S.C. 119(e) to a Provisional Application for Patent filed on Nov. 17, 2003, having a Ser. No. 60/520,720, and a title of Call Delivery in a CDMA Legacy MS Domain for SIP Call Origination, expired.

BACKGROUND

1. Technical Field

The present invention relates generally to communication networks, and more particularly, to CMDA2000 network that uses Session Initiation Protocol (SIP) for call delivery over a wireless communication network.

2. Related Art

Traditional telephone networks, including the Public Switched Telephone Network (PSTN) and Signaling System Number 7 (SS7) networks, have provided closed systems that enabled users to achieve added capabilities beyond merely connecting a call. Initially, message storage capabilities such as those provided by answering machines and voice mail services (in SS7 networks) were popular. Since then, many other services have been developed as SS7 and other intelligent networks (IN and AIN) have gained widespread popularity. With the advent of Internet telephony, a need to provide voice and video mail services, as well as traditional services, has been realized.

During the past few years, Internet telephony has evolved from being a novelty for the technically oriented seeking party conversation material to a technology that, in the not too distant future, may largely replace the existing telephone networks. Supporting the widespread use of Internet telephony requires a host of standardized protocols to ensure transport audio and video data having a specified quality of service (QoS). These protocols are also needed to provide directory services and to enable signaling. Signaling protocols are of particular interest because they are the basis for advanced services such as mobility, universal numbers, multiparty conferencing, voice mail, and automatic call distribution.

SIP's strengths as such a protocol include its simplicity, scalability, extensibility, and modularity. As a result, increasing interest in SIP is being realized as the SIP standards and protocol requirements develop into maturity. The SIP is defined in RFC 3261. RFC 3261 defines the application-layer control protocol that can be used to establish, modify, and terminate multimedia sessions (e.g., Internet telephone calls)

As a traditional text-based Internet protocol, SIP resembles the hypertext transfer protocol (HTTP) and simple mail transfer protocol (SMTP). SIP uses Session Description Protocol (SDP) for media description. SIP, however, is independent of the transport layer (i.e., IP). Among SIP basic features, the protocol also enables personal mobility by providing the capability to reach a called party at a single, location-independent address.

SIP's basic architecture is client/server in nature. The main entities in SIP are the User Agent, the SIP Proxy Server, the SIP Redirect Server and the Registrar.

The User Agents, or SIP endpoints, function as clients (UACs) when initiating requests and as servers (UASs) when responding to requests. User Agents communicate with other User Agents directly or via an intermediate server. The User Agent also stores and manages call states.

SIP servers have the capability to behave as a proxy or to provide redirection to another SIP server. SIP Proxy Servers forward requests from the User Agent to a next SIP server in a network having a plurality of SIP servers and may also retain information for billing/accounting purposes. SIP Redirect Servers respond to client requests and inform them of the requested server's address. SIP servers can either maintain state information (stateful) or forward requests in a stateless fashion. Generally, SIP is independent of the packet layer and only requires a datagram service. SIP also supports mechanisms for encryption and authentication.

Current CDMA related standards for Legacy Circuit-Switched networks only address using network protocols such as SS7 for call delivery. Thus, a call origination message to the call serving switch (referenced as MSCe that is responsible for the called mobile) is implemented using SS7 defined protocols. This delivery transport has several drawbacks for mobile-to-mobile calls. One that is significant is that mobile-to-mobile calls in the bearer path (path actually carrying the voice between the two mobiles) will require two transcodings by two transcoders. A transcoder is a device that inputs a data stream in one format and output the data stream in another format (e.g., input is a voice data stream encoded using SMV and the output is a data stream encoded using ITU G.711). Other types of encoding for compressed speech that may be used included but are not limited to SMV and EVRC compressed speech encoders. For audio data streams transcoding is undesirable for it decreases voice quality and increases time delay between the two endpoints. A need exists, therefore, for a system and method that minimizes a number of transcodings to minimize call degradation.

Another shortcoming relates to ringback procedures. Heretofore, a serving network element such as the serving MSCe has determined when ringback procedures are to be initiated to generate a ringing sound to the calling party. Because wireless networks are being merged with data packet technologies, however, traditional functionality such as where ringback is provided, may not be optimal according to specific network conditions. A need exists, therefore, for ringback decision making logic that selectively allows another circuit element besides the serving MSCe to generate or initiate ringback for the calling party.

SUMMARY OF THE INVENTION

This invention describes the interactions required for a CDMA LMSD network for voice call negotiation when the call origination message to the MSCe that is in control of the called telephone number is a SIP message containing Session Description Parameters (as defined in RFC2327). The SDP parameters are used to possibly setup a call that may result in the use of no transcoder in the voice path between a calling party and a called party.

The call negotiation process according to the described embodiment of the invention allows for the possibility that any transcoding in voice bearer path from calling party to called party be eliminated to provide Transcoder Free Operation (TrFO). In other situations, the described embodiment allows for the possibility that transcodings are not eliminated but are reduced wherein the number of transcoders used in the bearer path are reduced to 1 or what is known as Remote Transcoder Operation (RTO) instead of 2 transcoders as is presently required for prior art networks.

Additionally, the embodiments of the invention generally include transmission of messages and interactions between network entities within a CDMA Legacy MS Domain that allow a call from a calling party, to be connected to a called mobile (presently in Idle mode, that is not actively engaged in a call) and being served by an MSCe that is other than the MSCe for which the IP network has initially established a signaling connection in a manner that reduces the number of transcodings and facilitates ringback operation.

The embodiments of the invention provide for a call delivery message to be delivered to the terminating MSCe (serving MSCe) using SIP. The SIP message used for call delivery (i.e., SIP INVITE), carry more information in the call delivery message than may be carried in legacy SS7 call setup and delivery messages, and more specifically, carry a list of voice codecs used by the calling mobile. This additional information can possibly result in a call negotiation that uses less than two transcoders in the bearer path. The method and system of the embodiments of the invention address how the LMSD network elements will use SIP call origination message (i.e., SIP INVITE) to trigger locating the calling mobile, and to do call negotiation to possibly minimize the number of transcoders used in the bearer path.

For example, a method and system of the embodiments of the invention allow a calling party device to determine a codec that a receiving device is also capable of using, thus avoiding a transcoding to an intermediate format that is then transcoded again at the receiving end. Any reduction in the number of transcoders between the calling party and the receiving party will result in improved voice quality, reduced time delays, and reduced bandwidth requirements for the voice transport system. More particularly, one embodiment of the invention includes message flows and network entity interactions for CDMA Legacy MS Domain Call Delivery to an Idle Mobile Station that is outside the serving area of the MSCe from which the call originates.

An additional aspect of the embodiment of the present invention includes a serving MSCe that is operable to determine whether to initiate ringback to the calling party. If ring back is to be initiated, ringback can be initiated from the serving MSCe or from a network element supporting the calling party. Other aspects of the present invention will become apparent with further reference to the drawings and specification that follow.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Figure 1:
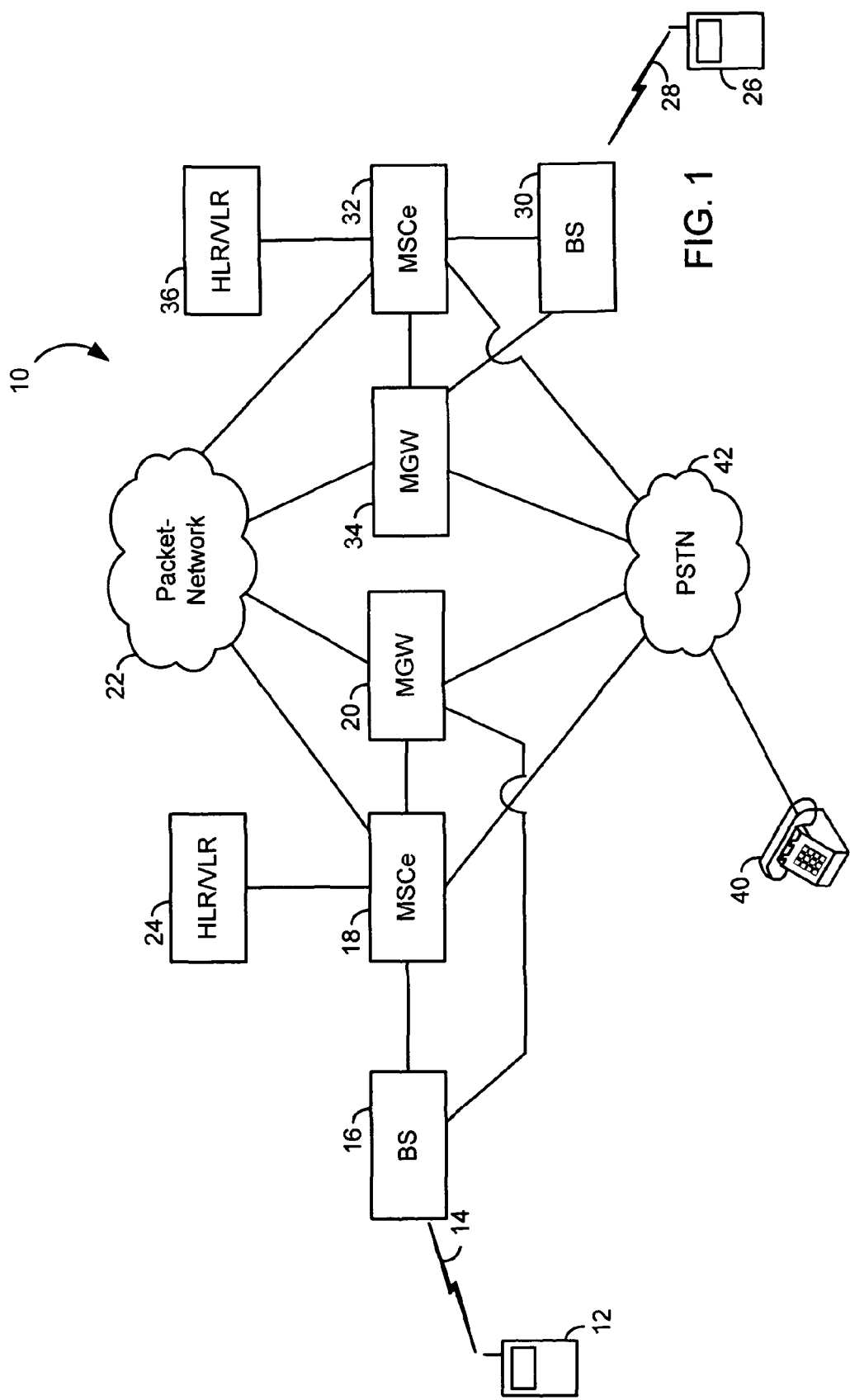
FIG. 1 is a functional block diagram of a communication network formed according to one embodiment of the invention.

FIG. 1 is a functional block diagram of a communication network formed according to one embodiment of the invention. Referring now to FIG. 1, a wireless network shown generally at 10 comprises, in the described embodiment, a legacy code division multiple access (CDMA) network with a SIP/IP network overlay utilized for call setup according to one embodiment of the invention. While the described embodiment is for a CDMA network, the invention is not to be limited to such networks. It should be readily understood that the present teachings apply to other networks and wireless access technologies as well.

CDMA related standards for Legacy Circuit-Switched networks only address using intelligent network protocols such as SS7 for call delivery. In the network of FIG. 1, however, session initiation protocol (SIP) is utilized to assist with call control functionality (e.g., call setup, call termination). As such, additional information is carried in the call setup signaling (i.e., SIP) not provided for in traditional SS7 signaling. This additional information can possibly allow for a reduction in a number of transcodings that occur between originating and terminating mobile stations. Traditional, mobile-to-mobile calls that use Legacy circuit-switched networks require two transcodings (by two transcoders) in the voice bearer path. The network of FIG. 1, however, provides for a system and method that allow for the possibility of minimizing the number of voice transcodings and thus minimizing voice call degradation.

One of the problems generated in a network relates to how and what network elements will generate the ringback tones to the calling party. A need exists, therefore, for ringback decisions that selectively allows another network element besides the serving MSCe to generate or initiate ringback for the calling party.

Heretofore, a serving network element such as the serving MSCe (the network element presently providing IP network access to the called party) will determine when and what type of ringback procedures are to be initiated to generate a ringing sound to the calling party.

Along these lines, the network shown at 10 in FIG. 1 includes a mobile station (MS) 12 that is operatively coupled to communicate with and through network 10 by a communication link 14 that is established between MS 12 and a base station (BS) 16. BS 16 comprises a base station controller and a base station transceiver (radio and antenna) that form communication link 14 with MS 12. BS 16 is further coupled to a mobile switching center (MSCe) 18 for providing switching and routing for calls. An MSCe 18 is coupled to media gateway (MGW) 20 and to a packet network 22. It should be further noted packet network 22 that can include any packet network including but not limited to the Internet. A MGW 20 is coupled to packet network 22. MSCe 18 is further coupled to a home location register/visitor location register (HLR/VLR) 24 to obtain subscriber and location information for mobile stations presently being served by MSCe 18. In a similar manner, an MS 26 communicates over a communication link 28 with a BS 30. BS 30 is further coupled to an MSCe 32 which is coupled to an MGW 34, Internet 22 and to an HLRNLR 36. Finally, as may be seen, a landline phone 40 is coupled to a public switched telephone network 42 which is coupled to MSCe 18/MSCe 32 for call signaling and MGW 20/MGW 34 for transporting the call bearer.

In operation, when MS 12 initiates a call to MS 26, for example, by transmitting call setup signals, the present embodiment of the invention is operable to carry a list of voice codecs that MS 12 supports. Thus, the network elements of network 10 are operable to carry signaling that includes the list of MS 12 voice codecs. Thus, the list of codecs supported by MS 12 are transmitted to BS 16. The list of MS 12 supported codecs are passed by BS 16 to MSCe 18. MSCe 18, creates a list of codecs based upon transcoder information from MGW 20 and BS 18 and also upon the supported codecs from MS 12 and is operable to transmit the list of codecs through packet network 22 to MSCe 32.

MSCe 32 then uses BS 30 to determine what voice codecs are presently supported by MS 26 by using communication link 28. MSCe 32 also determines what transcoders are available in BS 30 and MGW 34. Using all the collected transcoder information (from MGW 34 and BS 30 and codec information from MS 26, MSCe 32 then matches the list of codecs send by MSCe 18 or rejects all of the voice codecs in the list.

The matched codec information (or rejection information) is then sent back from MSCe 32 through packet network 22 to MSCe 18. MSCe 18 configures MGW 20, BS 16 and MS 12 based upon information sent by MSCe 32.

Advantageously, the system and method provide, therefore, for reducing or eliminating transcodings whenever a calling party and called party are operable to utilize common codec or transcoder outputs as compared to a Legacy circuit-switched network that uses SS7 for call control in which at least two transcodings occur. For example, if MS 12 and MS 26 are supporting the same voice codec (e.g., compressed speech, codec-A), then MSCe 18 sends codec-A as part of it's list of codecs to MSCe 32. MSCe 32 returns codec-A as part of its return information to MSCe 18. In this example, no transcoding is performed in BS 16, MGW 20, MGW 34 and BS 30. Thus codec-A is utilized from MS 12 to MS 26 minimizing associated resources for conducting such speech through network 10.

Figure 2A:
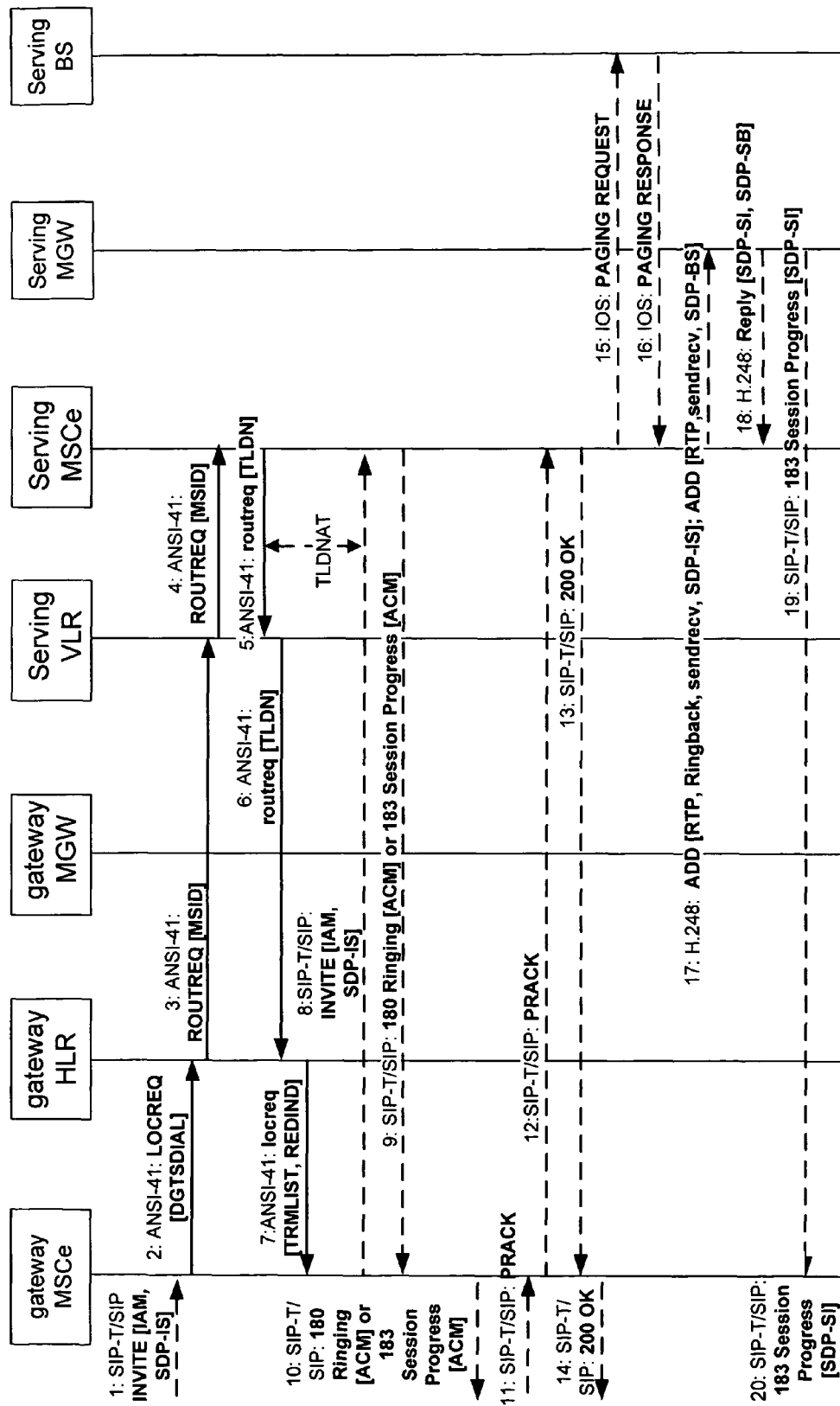
FIGS. 2A and 2B are signal sequence diagrams that illustrate call delivery to an idle MS on another MSCe (SIP-T/SIP) according to one embodiment of the invention.
Figure 2B:
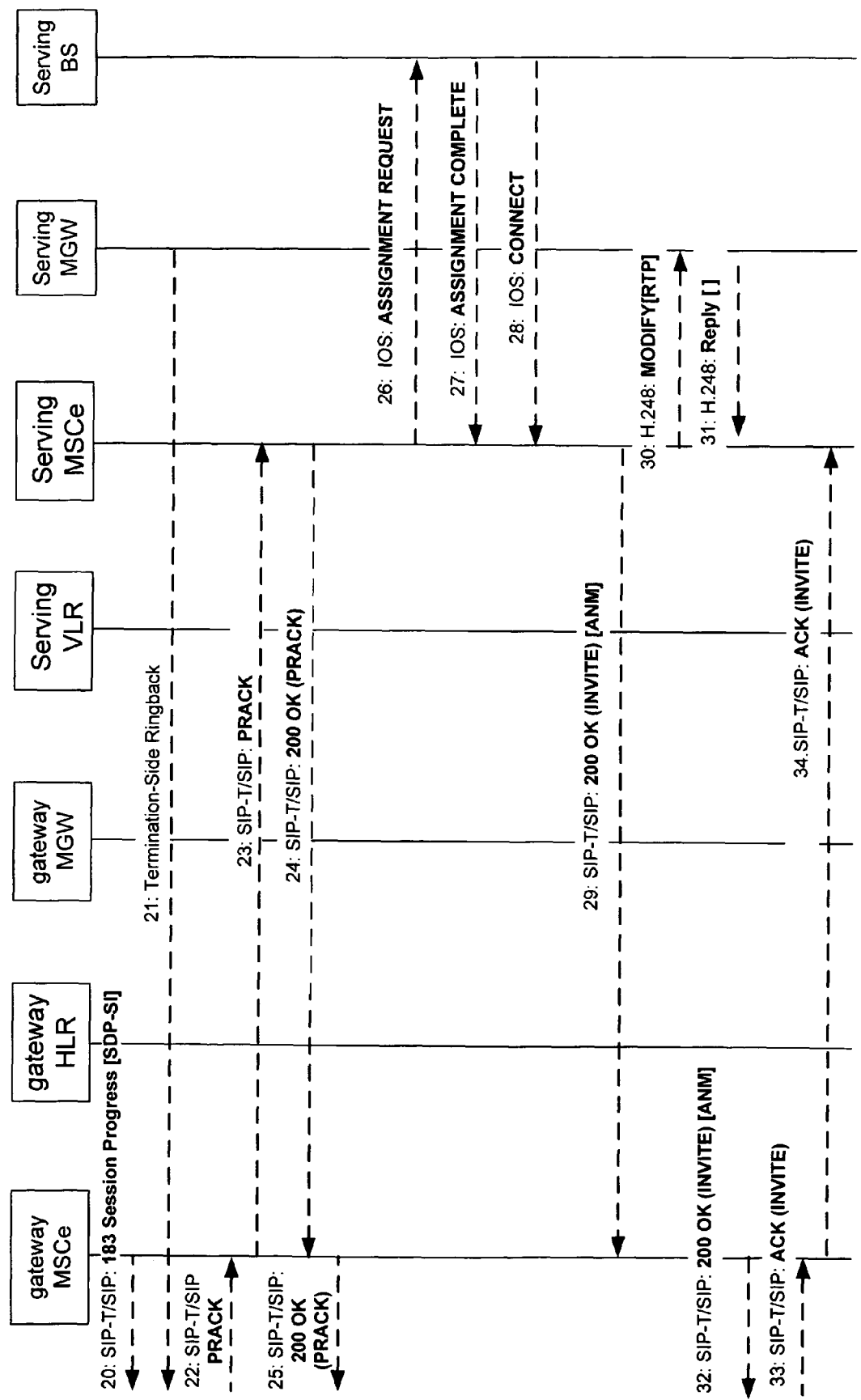

FIGS. 2A and 2B are signal sequence diagrams that illustrate call delivery to an idle MS on another MSCe (SIP-T/SIP) according to one embodiment of the invention. The method of FIGS. 2A and 2B include the following steps:

1. An INVITE [RFC3261] message is received by the originating or gateway MSCe (hereinafter gateway MSCe). The INVITE message contains the called number (dialed number). The gateway MSCe is an MSCe responsible for the mobile station assigned to that called number. The network serving the calling device (e.g., mobile station, wireless palm pilot, etc) initiates the INVITE message. The INVITE message contains SDP-IS (an Session Description Protocol message embedded in the SIP message) and may contain an IAM [ISUP] message. SDP-IS contains a prioritized list of vocoders and/or codecs that are to be used for call negotiation.

2. The gateway MSCe sends a LOCREQ [41-1] to the HLR associated with the MS; this association is made through the dialed MS address digits (which may not be the MIN (Mobile Identification Number)).

3. The HLR determines if the dialed MS address digits are valid. If the dialed MS address digits are assigned to a legitimate subscriber, the HLR sends a ROUTREQ [41-1] to the VLR where the MS is registered.

4. The VLR then forwards the ROUTREQ to the current serving MSCe.

In reaction to the ROUTREQ the serving MSCe consults its internal data structures to determine if the MS is already engaged in a call on this MSCe.

5. The serving MSCe allocates a TLDN (Temporary Local Directory Number) and returns this information to the VLR in the routreq [41-1]. The serving MSCe starts timer TLDNAT [41-1].

6. The VLR sends the routreq to the HLR.

7. When the routreq is received by the HLR, it returns a locreq [41-1] to the gateway MSCe. The locreq includes routing information in the form of the TerminationList parameter [41-1], along with an indication of the reason for extending the incoming call (i.e., for CD) in the DMH_RedirectionIndicator parameter [41-1].

The gateway MSCe translates the TDLN (allocated in Step 5) to an IP address/UDP Port Number and a SIP URI for the serving MSCe.

8. The gateway MSCe sends an INVITE message to the serving MSCe. The serving MSCe is the MSCe that provides voice access to the called party. The INVITE message contains SDP-IS and an IAM message (if present in step 1). The serving MSCe will use the TDLN to make the association with the MSID received in the ROUTREQ message (Step 4).

9. Any time after the INVITE has been received (Step 8) and anytime before Step 16, the serving MSCe shall send either a 180 Ringing [RFC3261] message or a 183 Session Progress [RFC3261] message to the gateway MSCe. The 180 Ringing message or 183 Session Progress message may contain an ACM [ISUP] message. If the serving MSCe elects to initiate Origination-Side ringback then a 180 Ringing message is sent, otherwise a 183 Session Progress [RFC3261] message is sent. The 180 Ringing message is a signaling command that informs the network element (MSCe)/terminal device (for case of non-wireless networks) that is performing call control for the calling party to also provide ringback (progress tones) to the calling party.

10. The gateway MSCe forwards the 180 Ringing message or the 183 Session Progress [RFC3261] message to the IP Network.

11. In response to the 18x message, a PRACK [RFC3262] message may be received by the gateway MSCe. The PRACK message confirms that the 18x message (Step 10) was received by the network supporting the originating mobile (mobile that made the call).

12. The gateway MSCe forwards the PRACK message to the serving MSCe.

13. The serving MSCe sends a response to the PRACK message (e.g., 200 OK) to the gateway MSCe.

14. The gateway MSCe forwards the response to the PRACK message to the IP network.

15. After receiving an INVITE message (Step 5) the serving MSCe sends a Paging Request [IOS5] message to the BS to initiate a mobile terminated call setup scenario. The Paging Request message may contain a "Desired Codec" for the terminated mobile. The "Desired Codec" is a voice codec that the serving MSCe would like the terminating mobile to use after acknowledging the Paging Request. Since the serving MSCe has no knowledge of what voice codecs the terminating mobile supports, this request can be rejected by the MS 16. After the mobile responses to the page from the BS, the BS constructs the Paging Response message [IOS5]-, places it in the Complete Layer 3 Information message, and sends the message to the serving MSCe. The Paging Response message contains one or more voice codecs that the terminating mobile station supports, a list of available BS transcoders, and the connection information for the BS communications channel (e.g., the IP address and UDP port that the BS desires to receive bearer traffic on).

17. The serving MSCe establishes a context with a Serving MGW. The H.248 message consists of two ADD commands. The first ADD command establishes a termination for a bearer channel using RTP towards the IP Network. The mode is set to sendrecv. If the serving MSCe elects to initiate Termination-Side ringback, then ringback from the termination is initiated. SDP-IS is the remote SDP containing the bearer connection information (e.g., desired IP address, UDP Port number for receiving bearer packets on) for the network element/terminal device that generated the INVITE (step 1) and containing a voice codec list.

The second ADD command establishes a termination for the BS communication channel with a mode set to sendrecv. SDP-BS is the remote SDP containing the Serving BS connection information (e.g., IP address, UDP Port number) and also containing a voice codec list.

18. The Serving MGW replies to the H.248 message. The Reply message contains SDP-SI and SDP-SB. SDP-SI is the local SDP for the termination towards the IP network and contains the Serving MGW connection information (e.g., the IP address, UDP Port number that the Serving MGW desires to receive bearer packets on) for this termination. SDP-SB is the local SDP for the termination towards the Serving BS and contains the Serving MGW connection information for this termination.

19. The serving MSCe sends the gateway MSCe a 183 Session Progress [RFC3261] message containing SDP-SI. SDP-SI shall contain one or more voice codecs. This message is the answer to the offer made in the original INVITE (step 1) from the network supporting the calling party. For TrFO (no transcoding in the bearer path from calling party to the called party) to occur, one of the codec values in SDP-SI would have to be the same as one of the voice codec values in the SDP-IS (Step 1). For remote terminal operation (RTO) to possibly occur, meaning one transcoder in the voice bearer path between the calling party and the called party, the serving MSCe would either assign the serving MGW to perform the voice transcoding or have the BS perform the voice transcoding (see step 26) based upon information received in step 17.

20. The gateway MSCe sends a 183 Session Progress [RFC3261] message containing SDP-SI (same as in step 19) to the IP network. The 183 Session Progress containing SDP-SI is also a signal to the network element (MSCe)/terminal device (for case of non-wireless networks) that is performing call control for the calling party to now discontinue any ringback (progress tones) to the calling party 21. If the serving MSCe has elected to initiate Termination-Side ringback (Step 17) then ringback from the Serving MGW is sent through the Originating MGW to the IP network.

22. In response to the 183 Session Progress message (Step 20), a PRACK [RFC3262] message may be received by the gateway MSCe.

23. The gateway MSCe forwards the PRACK message to the serving MSCe.

24. The serving MSCe sends a response to the PRACK message (e.g., 200OK) to the gateway MSCe.

25. The gateway MSCe forwards the response to the PRACK message to the IP network.

26. After receiving a Page Response [IOS5] message (Step-16), the serving MSCe sends an Assignment Request message to the BS to request assignment of radio resources. The Assignment Request message contains the Serving MGW connection information (the IP address and UDP port number that the Serving MGW desires to received bearer traffic on. This information is obtained from SDP-SB), the codec assignment for the terminating MS and a request of BS transcoding (if required).

27. After the radio traffic channel and circuit have both been established, the BS sends the Assignment Complete [IOS5] message to the serving MSCe.

28. The BS sends a Connect [IOS5] message to the serving MSCe to indicate that the call has been answered at the terminating MS. At this point, the call is considered stable and in the conversation state.

29. After receiving the Connect message from the BS, the serving MSCe sends a 200 OK message to the gateway MSCe. The message may contain an ANM [ISUP] and acknowledges that the INVITE (Step-8) message has succeeded.

30. If the serving MSCe elected to initiate Termination-Side ringback (Step 17), then the serving MSCe will send a H.248 message to the Serving MGW. The H.248 message contains a MODIFY command to deactivate the Ringback for the termination towards the IP Network.

31. The Serving MGW acknowledges the H.248 message with a Reply message.

32. The gateway MSCe forwards the 200 OK message (Step 29) to the IP Network.

33. In response to the 200 OK message (Step 32), a ACK [RFC3261] message is received by the gateway MSCe 34. The gateway MSCe forwards the ACK message to the serving MSCe. The ACK message confirms the reception of the final response (i.e., 200 OK in Step 29).

Figure 3:
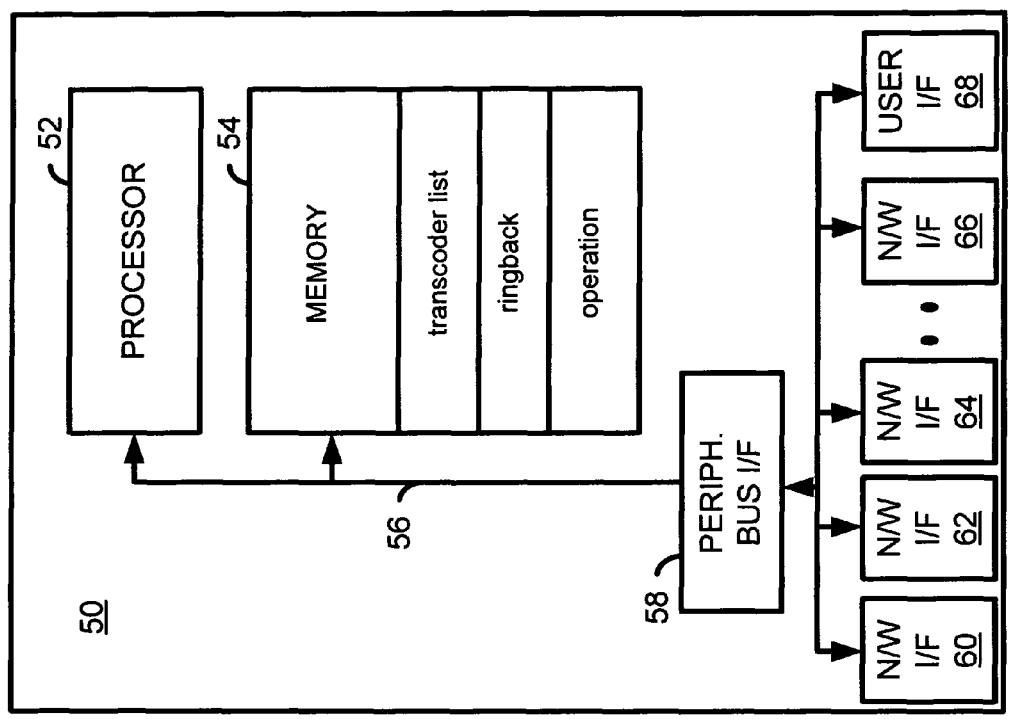
FIG. 3 is a functional block diagram of a MSCe formed according to one embodiment of the invention.

FIG. 3 is a functional block diagram of an MSCe formed according to one embodiment of the invention. Referring now to FIG. 3, an MSCe 50 includes a processor 52 that is operable to retrieve computer instructions from memory 54 over a bus 56, which computer instructions define operational logic of MSCe 50. More specifically, the computer instructions define logic for processing a transcoder list as described herein, logic for ringback operation as disclosed herein, and logic for routine MSCe operation. The logic for routine operation includes logic for communicating through at least one network port utilizing standardized protocols.

Bus 56 is further coupled to a peripheral bus interface 58 which is, in turn, connected to at least one network port. In the described embodiment, MSCe 50 includes at least five network ports labeled as network I/Fs (interfaces) 60-68. Thus, MSCe 50 is operable to receive a list of transcoders from a mobile station through one network interface 60-68 and to forward the list of transcoders through the network through another network interface 60-68. Additionally, MSCe 50 is operable to determine whether to generate a ringback or whether to allow another MSCe (such as a gateway MSCe) to generate ringback to the calling party. In the described embodiment, MSCe 50 includes operational logic that enables it to act as an originating MSCe, a gateway MSCe and a terminating (serving) MSCe.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims. Additionally, the computer instructions may be modified to create permutations of the inventive methods or signals whose differences from what is disclosed and claimed are insubstantial. The described embodiments may be modified in many different ways without departing from the scope or teachings of the invention.

References and Acronym Definitions:

| | |
|---|---|
| ACM | Address Complete Message. Defined as part of [ISUP] |
| ADD | H.248 Command - The Add command adds a Termination to a Context. The Add command on the first Termination in a Context is used to create a Context. |
| ANM | Answer Message. Defined as part of [ISUP] |
| BS | Base Station |
| CDMA | Code division multiple access |
| CODEC | Compressor/decompressor - a codec is any technology for compressing and decompressing data |
| EVRC | Enhanced Variable Rate Codecs The Enhanced Variable Rate Codec (EVRC) compresses each 20 milliseconds of 8000 Hz, 16-bit sampled speech input into output frames in one of the three different sizes: |

| | References and Acronym Definitions: |
|---|---|
| | Rate 1 (171 bits), Rate 1/2 (80 bits), or Rate 1/8 (16 bits). The EVRC codec is defined in: 3GPP2 C.S0014, "Enhanced Variable Rate Codec, Speech Service Option 3 for Wideband Spread Spectrum Digital Systems", January 1997. |
| HLR | Home Location Register is the location register to which a user identity is assigned for record purposes such as subscriber information (e.g. ESN, MDN, Profile Information, Current Location, and Authorization Period). The HLR may, or may not be located within, and be indistinguishable from an MSCe. The HLR may serve more than one MSCe. The HLR may be distributed over more than one physical entity. |
| Gateway Network | The Gateway Network of an MS is where the MS's Directory Number is assigned. |
| H.248 | Defines the protocols used between elements of a physically decomposed multimedia gateway (e.g., ITU-T Recommendation H.248.1). |
| IAM | Initial Address Message. Defined as part of [ISUP] |
| INVITE | A SIP Method (defined is RFC3261) that that specifies the action that a calling party wants from a called party. |
| IOS | Interoperability Specification |
| [IOS5] | Interoperability Specification that is defined in 3GPP2 A.S0011-C through A.S0017-C. |
| IP | Internet Protocol - there are two version of IP, IPv4 (defined in IETF RFC 0791) and IPv6 (defined in IETF RFC 2460). |
| ISUP | ISDN User Part |
| [ISUP] | Defined in either ITU-T Q.761-764 or ANSI T1.113-2000 |
| LMSD | Legacy MS Domain |
| MGW | Media GateWay |
| MODIFY | H.248 command - The Modify command modifies the properties, events and signals of a Termination. |
| MS | Mobile Station - wireless terminal device |
| MSCe | Mobile Switching Center emmulation |
| MSID | Mobile Station Identifier |
| Origination-Side Ringback | Ringback (call progress tones) that are generated by some element within the Network supporting the calling party (e.g., a MGW or a terminal device) |
| PRACK | Provisional Response ACKnowledgement - An extension to the Session Initiation Protocol (SIP) providing reliable provisional response messages (defined in IETF RFC 3262) |
| PSTN | Public Switched Telephone Network |
| [RFC3261] | IETF RFC 3261, "The Session Initiation Protocol". June 2002, IETF, |
| REDREQ | The RedirectionDirective operation (TIA-41) is used during feature processing to direct the MSCe to forward the indicated call. |
| Reply | Reply to an H.248 Command (e.g., ADD) |
| RTO | Remote Transcoder Operation: a network capability for endpoints with incompatible codecs. RTO attempts to enable the bearer by matching the incompatible codecs with a single transcoder. Ideally compressed speech is passed between the endpoints. |
| RTP | Real-Time Transport Protocol (defined in IETF RFC 1889) |
| SDP | Session Description Protocol (defined in RFC 2327) |
| Serving Network | The network in which the terminal device (e.g., MS) is currently registered. |
| SIP | Session Initiation Protocol (defined in RFC 3261) |
| SIP-T | Session Initiation Protocol for Telephones (defined in RFC 3272) |
| SMV | Selectable Mode Vocoders. The Selectable Mode Vocoder (SMV) [2] compresses each 20 milliseconds of 8000 Hz, 16-bit sampled speech input into output frames of one of the four different sizes: Rate 1 (171 bits), Rate 1/2 (80 bits), Rate 1/4 (40 bits), or Rate 1/8 (16 bits) The SMV Vocoder is defined in: 3GPP2 C.S0030-0 v2.0, "Selectable Mode Vocoder, Service Option for Wideband Spread Spectrum Communication Systems", May 2002. |
| SS7 | Signaling System Number 7 |
| SUBTRACT | H.248 command - The Subtract command disconnects a Termination from its Context and returns statistics on the Termination's participation in the Context. The Subtract command on the last Termination in a Context deletes the Context. |
| TelURI | Telephone URL. Format for TelURI is defined in IETF RFC2806, "URLs for Telephone Calls", April 2000 |
| Termination-Side Ringback | Ringback (call progress tones) that are generated by some element within the Network supporting the called party (e.g., a MGW or a terminal device) |
| TrFO | Transcoder Free Operation: a network capability for mobile-to-mobile calls, where the mobiles have identical codecs. TrFO enables the bearer path without introducing vocoders in the voice bearer path. Compressed speech is passed between the terminal device endpoints. |
| TLDN | Temporary Local Directory Number |
| TRANUMREQ | The TransferToNumberRequest operation (defined in TIA-41) is used during feature processing to obtain an MS's forward-to number from the HLR. |
| Transcoder | A function (e.g., implementaed in Software or Hardware) that changes data from one format to another (e.g., from EVRC to SMV) |
| UDP | User Datagram Protocol. Protocol defined in IETF RFC 0768. |
| Vocoder | Voice codec. |
| VLR | The Visitor Location register (VLR) is the location register other than the HLR used by an MSCe to retrieve information for handling of calls to or from a visiting subscriber. The VLR may, or may not be located within, and be indistinguishable from an MSCe. The VLR may serve more than one MSCe. |
| [41-1] | ANSI/TIA/EIA-41-D "Cellular Radiotelecommunications Intersystem Operations", December 1997. |

The invention claimed is:

1. A serving mobile switching center (MSCe) for call delivery to a mobile station serviced by a wireless communication network, comprising:
    circuitry operable to receive call signals indicating a call setup with the mobile station of a called party;
    circuitry operable to perform the call setup to establish a communication link with the mobile station, further including circuitry for determining whether to provide ringback to a mobile station of a calling party; and
    wherein the serving MSCe is further operable to:
        receive a prioritized list of voice CODECs (SDP-IS) in a Session Initiation Protocol (SIP) call origination message, the SDP-IS including a list of prioritized voice CODECs received by a gateway MSCe relating to the call setup;
        provide a requested voice codec list to the mobile station of the called party;
        receive a list of supported voice CODECs from the mobile station of the called party;
        receive a list of supported transcoders from a base station serving the mobile station of the called party;
        perform transcoder free operation (TrFO) or remote transcoder operation (RTO) based upon the prioritized list of voice CODECs, the list of supported voice CODECs from the mobile station of the called party, and the list of supported transcoders from the base station serving the mobile station of the called party and assigns transcoders in at least one of a serving media gateway (MGW) and a serving base station (BS) for a voice bearer path between the mobile stations of the calling party and of the called party; and
        initiate a ringback to the mobile station of the calling party, wherein, when ringback is initiated, then any time after the SIP call origination message has been received for call setup, the MSCe is operable to send a 180 Ringing message to the network supporting the mobile station of the calling party, the 180 Ringing message is a signaling command to the network supporting the mobile station of the calling party to also ringback to the mobile station of the calling party.

2. The serving MSCe of claim 1 wherein the serving MSCe assigns no transcoders to the serving MGW or the serving BS to effect TrFO operation.

3. The serving MSCe of claim 1 wherein the serving MSCe assigns a transcoder to the serving MGW and not to the serving BS to support the voice bearer path between the mobile stations of the called party and of the calling party and to provide RTO operation.

4. The serving MSCe of claim 1 wherein the serving MSCe assigns a transcoder to the serving BS and not to the serving MGW to support the voice bearer path between the mobile stations of the called party and of the calling party to provide RTO operation.

5. The serving MSCe of claim 1 wherein the MSCe is further operable to determine whether to discontinue ringback to the mobile station of the calling party by sending a 183 Session Progress containing an SDP message for a ringback previously initiated by transmission of a 180 Ringing message.

6. A serving mobile switching center (MSCe) for call delivery to a mobile station serviced by a wireless communication network, comprising:
   circuitry for receiving call signals indicating a call setup with the mobile station of a called party;
   circuitry for performing the call setup to establish a communication link with the mobile station of the called party, further including circuitry for determining whether to provide ringback to a mobile station of a calling party; and
   wherein the serving MSCe is operable to:
      receive a prioritized list of voice CODECs (SDP-IS) in a Session Initiation Protocol (SIP) call origination message wherein the SDP-IS includes a list of prioritized voice CODECs received by a gateway MSCe for the call setup;
      provide a requested voice codec list to the mobile station of the called party;
      receive a list of supported voice CODECs from the mobile station of the called party;
      receive a list of supported transcoders from a base station serving the mobile station of the called party;
      determine whether to perform transcoder free operation (TrFO) or remote transcoder operation (RTO) based upon the prioritized list of voice CODECs, the list of supported voice CODECs from the mobile station of the called party, and the list of supported transcoders from the base station serving the mobile station of the called party;
      assign transcoders in at least one of a serving media gateway (MGW) and a serving base station (BS) for a voice bearer path between the mobile stations of the calling party and of the called party; and
      trigger a called party location procedure, including:
         sending a LOCREQ message to a home location register (HLR) associated with the mobile station of the called party;
         receiving a ROUTREQ message from a visitor location register (VLR) of which the mobile station of the called party is registered, the VLR previously receiving a ROUTREQ message from the HLR when the dialed MS address digits are assigned to a legitimate subscriber; and
         determining whether the mobile station of the called party is already engaged in another call.

7. The serving MSCe of claim 6 wherein the serving MSCe assigns no transcoders to the serving MGW nor to the serving BS to effect TrFO operation.

8. The serving MSCe of claim 6 wherein the serving MSCe assigns a transcoder to the serving MGW and not the serving BS to support the voice bearer path between the mobile stations of the called and of the calling party and to provide RTO operation.

9. The serving MSCe of claim 6 wherein the serving MSCe assigns a transcoder to the serving BS and does not assign a transcoder to the serving MGW to support the voice bearer path between the mobile stations of the called and of the calling party to provide RTO operation.

10. The serving MSCe of claim 6 wherein the MSCe is further operable to determine whether to discontinue ringback to the mobile station of the calling party by sending a 183 Session Progress containing an SDP message for a ringback previously initiated by transmission of a 180 Ringing message.

11. A method in a serving mobile switching center (MSCe) for call delivery to a mobile station serviced by a wireless communication network, the service MSCe includes circuitry operable to receive call signals indicating a call setup with the mobile station of a called party, and circuitry operable to perform the call setup to establish a communication link with the mobile station, the method comprising:
   receiving a prioritized list of voice CODECs (SDP-IS) in a Session Initiation Protocol (SIP) call origination message, the SDP-IS including a list of prioritized voice CODECs received by a gateway MSCe relating to the call setup;
   providing a requested voice codec list to the mobile station of the called party;
   receiving a list of supported voice CODECs from the mobile station of the called party;
   receiving a list of supported transcoders from a base station serving the mobile station of the called party;
   determining transcoder free operation (TrFO) or remote transcoder operation (RTO) based upon the prioritized list of voice CODECs, the list of supported voice CODECs from the mobile station of the called party, and the list of supported transcoders from the base station serving the mobile station of the called party;
   assigning a transcoder to at least one of a serving media gateway (MGW) and a serving base station (BS) for a voice bearer path between the mobile stations of the calling party and of the called party; and
   initiating a ringback to the mobile station of the calling party, wherein, when ringback is initiated, then any time after the SIP call origination message has been received for call setup, sending a 180 Ringing message to the network supporting the mobile station of the calling party supporting the mobile station of the calling party to also ringback to the mobile station of the calling party.

12. The method of claim 11 wherein the assigning of the transcoder comprises:
   assigning TrFO operation where no transcoders are assigned to the serving MGW nor to the serving BS.

13. The method of claim 11 wherein the assigning of the transcoder comprises:
   assigning a transcoder to the serving MGW while not assigning a transcoder to the serving BS to support the voice bearer path between the mobile stations of the called party and of the calling party and to provide RTO operation.

14. The method of claim 11 wherein the assigning of the transcoder comprises:

assigning the transcoder to the serving BS and not to the serving MGW to support the voice bearer path between the mobile stations of the called party and of the calling party to provide RTO operation.

15. The method of claim 11 further comprising:

discontinuing ringback to the mobile station of the calling party by sending a 183 Session Progress containing an SDP message for a ringback previously initiated by transmission of a 180 Ringing message.

16. A method in a serving mobile switching center (MSCe) for call delivery to a mobile station serviced by a wireless communication network, the service MSCe includes circuitry operable to receive call signals indicating a call setup with the mobile station of a called party, and circuitry operable to perform the call setup to establish a communication link with the mobile station, the method comprising:

receiving a prioritized list of voice CODECs (SDP-IS) in a Session Initiation Protocol (SIP) call origination message wherein the SDP-IS is a list of prioritized voice CODECs received by a gateway MSCe for the call setup;

providing a requested voice codec list to the mobile station of the called party;

receiving a list of supported voice CODECs from the mobile station of the called party;

receiving a list of supported transcoders from a base station serving the mobile station of the called party;

determining whether to perform transcoder free operation (TrFO) or remote transcoder operation (RTO) based upon the prioritized list of voice CODECs, the list of supported voice CODECs from the mobile station of the called party, and the list of supported transcoders from the base station serving the mobile station of the called party;

assigning a transcoder in at least one of a serving media gateway (MGW) and a serving base station (BS) for a voice bearer path between the mobile stations of the calling party and of the called party; and triggering a called party location procedure by:

sending a LOCREQ message to a home location register (HLR) associated with the mobile station of the called party;

receiving a ROUTREQ message from a visitor location register (VLR) of which the mobile station of the called party is registered, the VLR previously receiving a ROUTREQ message from the HLR when the dialed MS address digits are assigned to a legitimate subscriber; and determining whether the mobile station of the called party is already engaged in another call.

17. The method of claim 16 wherein the assigning the transcoder comprises:

assigning TrFO operation where no transcoders are assigned to the serving MGW or to the serving BS.

18. The method of claim 16 wherein the assigning the transcoder comprises:

assigning a transcoder to the serving MGW while not assigning a transcoder to the serving BS to support the voice bearer path between the mobile stations of the called party and of the calling party and to provide RTO operation.

19. The method of claim 16 wherein the assigning the transcoder comprises:

assigning a transcoder to the serving BS and not to the serving MGW to support the voice bearer path between the mobile stations of the called and of the calling party to provide RTO operation.

20. The method of claim 16 further comprising:

discontinuing ringback to the mobile station of the calling party by sending a 183 Session Progress containing an SDP message for a ringback previously initiated by transmission of a 180 Ringing message.

* * * * *

UNITED STATES PATENT AND TRADEMARK OFFICE
CERTIFICATE OF CORRECTION

PATENT NO. : 8,199,727 B1  
APPLICATION NO. : 10/990735  
DATED : June 12, 2012  
INVENTOR(S) : Bienn et al.

Page 1 of 1

It is certified that error appears in the above-identified patent and that said Letters Patent is hereby corrected as shown below:

In Column 1, Line 18, delete "CMDA2000" and insert -- CDMA2000 --, therefor.

In Column 4, Line 52, delete "HLRNLR" and insert -- HLR/VLR --, therefor.

In Column 5, Line 5, delete "(from" and insert -- from --, therefor.

In Column 6, Line 44, delete "[IOS5]-," and insert -- [IOS5], --, therefor.

In Column 10, Line 17, delete "implementaed in Software or Handware)" and insert -- implemented in Software or Hardware) --, therefor.

Signed and Sealed this
Nineteenth Day of February, 2013

Teresa Stanek Rea
*Acting Director of the United States Patent and Trademark Office*